June 11, 1968  W. A. PARRISH, JR  3,388,233
ELECTRIC DISCHARGE MACHINING ELECTRODE AND ITS
METHOD OF CONSTRUCTION
Filed Feb. 16, 1966

Inventor
Walter A. Parrish, Jr.
By Lee H. Kaiser
Attorney 3,388,233
ELECTRIC DISCHARGE MACHINING ELECTRODE
AND ITS METHOD OF CONSTRUCTION
Walter A. Parrish, Jr., Homewood, Ill., assignor to Allis-
Chalmers Manufacturing Company, Milwaukee, Wis.
Filed Feb. 16, 1966, Ser. No. 527,920
6 Claims. (Cl. 219—69)

This invention relates to apparatus for electric discharge machining and in particular to an electrode assembly for electric discharge machining apparatus and to its method of construction.

Electric discharge machining apparatus is known for removing material from a workpiece by passing current of sufficiently high magnitude between an electrode and the workpiece to erode particles from the workpiece. A method is disclosed in application Ser. No. 450,054, filed Apr. 22, 1965 in the name of Alexander Dreisin, and having the same assignee as the present invention, for electrical discharge machining of diesel injection nozzles which provides close concentricity between an annular valve seat and the cylindrical bore in which the valve reciprocates. In the method of the aforementioned Dreisin application, an electrode having a tapered tip and being surrounded by an insulating sleeve having an accurately machined cylindrical surface concentric to said tip is positioned within the cylindrical bore while the valve body is rotated relative to the electrode. The electrode is guided from the cylindrical bore and insulated therefrom by the insulating sleeve, and the tapered tip is brought into close proximity to the valve seat during the electric discharge which erodes material from the valve body to machine the valve seat.

The insulating sleeve circumjacent the electrode is usually of ceramic material, and the brittleness of the ceramic material makes it unsatisfactory for certain machining operations, particularly when the electrode is employed in the electric discharge machining of a long valve body.

It is an object of the invention to provide an improved electrode assembly for the electric discharge machining of a surface closely concentric with a previously finished cylindrical surface.

It is a further object of the invention to provide an improved method for constructing an electric discharge machining electrode having a cylindrical guiding surface thereon insulated from the electrode and closely concentric with an electric discharge machining tip on the electrode.

These and other objects and advantages of the invention will be more readily apparent from the following detailed description when considered in conjunction with the accompanying drawing wherein.

Figure 1:
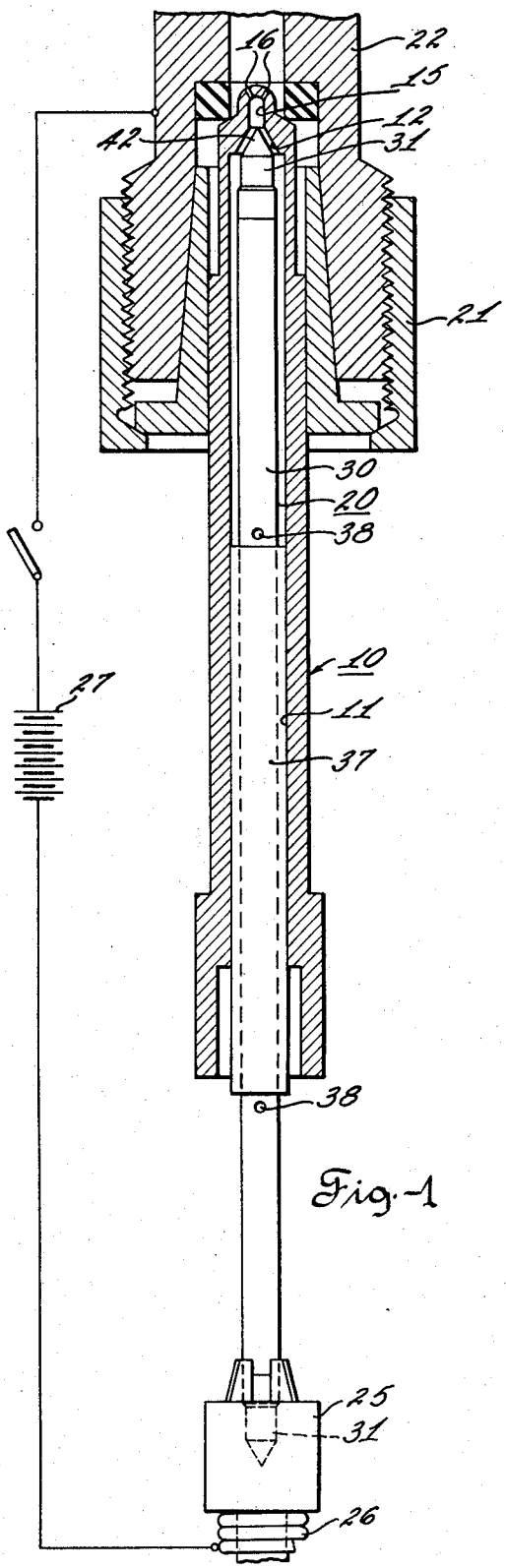
FIG. 1 is a section view through a portion of an electric discharge machining apparatus incorporating the novel electrode assembly of the invention and being employed to machine an annular valve seat in a diesel injection nozzle.
Figure 2:
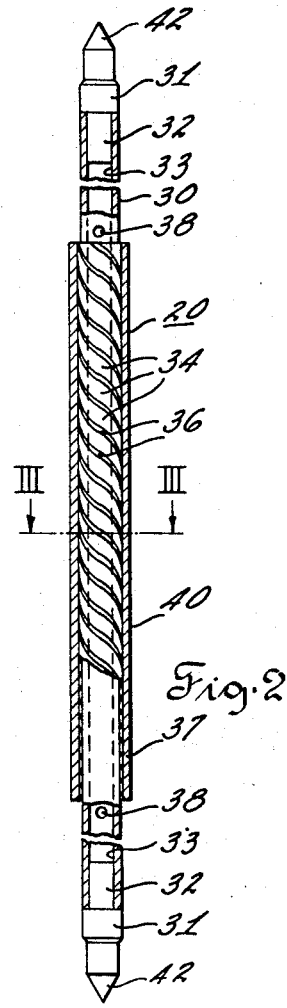
FIG. 2 is an elevation view, partly in section, of the electrode assembly of the invention shown in FIG. 1.
Figure 3:
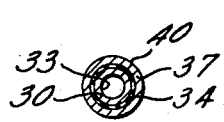
FIG. 3 is a view taken on line III—III of FIG. 2.

Referring to the drawing, a long diesel injection nozzle body 10 may be machined by conventional tools to have an axial bore 11, a conical valve seat 12 at one end in approximate concentric relation to bore 11, a fuel passage 15 at the end of bore 11, and spray holes 16 at an angle to the axis of bore 11. Nozzle body 10 may be heat treated to suitable hardness, and cylindrical bore 11 may be ground using an internal grinding machine and then lapped to provide a finely finished bore of accurate cylindrical shape which guides the electrode assembly 20 of the electric discharge machining apparatus. The nozzle body 10 is secured in the chuck 21 of an electrical discharge machine (not shown) having a rotatable spindle 22.

Electrode assembly 20 is positioned within and guided by bore 11 while valve body 10 is rotated by spindle 22 during the operation of electrical discharge machining of valve seat 12 on valve body 10. The lower end of electrode assembly 20 is secured within a chuck 25 supported by spring means 26 electrically connected to one terminal of a suitable source of electrical energy 27.

Electrode assembly 20 has a central tubular metallic electrode member 30 of smaller diameter than bore 11. Conical electric discharge machining tips 31 affixed to both ends of central electrode member 30 are preferably of a metal which exhibits the least amount of wear in the electric discharge machining operation, preferably tungsten copper carbide. Tips 31 may have a reduced diameter portion 32 which fits within the axial opening 33 in tubular electrode member 30 and is secured thereto by suitable means such as solder. Narrow elongated insulating strip 34 of high dielectric strength such as 1/8 inch wide varnished cambric tape of 0.010 inch thickness may be helically wound on electrode member 30 intermediate the ends thereof. A suitable thermosetting insulating adhesive 36 of high dielectric strength such as glue commercially available under the trademark Ecco-Bond is applied to the insulating strip 34, particularly between the helical turns thereof. An outer metallic guide sleeve 37 preferably of steel is inserted over the helical turns of insulating strip 34 and the adhesive 36, and the adhesive is then allowed to set. The insulating strip 34 holds the guide sleeve 37 in proper spaced relationship to central electrode member 30 while the adhesive 36 is curing to assure high dielectric strength between these members during use of the electrode assembly in the electric discharge machining process.

Radially extending apertures 38 may be provided in tubular electrode member 20 adjacent the ends of guide sleeve 37 for the passage through the axial opening 33 in tubular electrode member 30 of dielectric liquid which enters valve body 10 through spray holes 16 during the electric discharge machining operation.

A cylindrical surface 40 of slightly smaller diameter than bore 11 is very accurately machined on metallic guide sleeve 37 so that minimum clearance exists between surface 40 and the lapped bore 11 of nozzle body 10 when electrode assembly 20 is positioned within bore 11, and preferably cylindrical surface 40 is machined before guide sleeve 37 is assembled over and secured to the central electrode member 30.

Conical surfaces 42 complementary to the desired shape for the valve seat 12 may then be machined on electrode tips 31 while the electrode assembly 20 is rotated about the axis of cylindrical surface 40 on guide sleeve 37.

The electrode assembly 20 remains stationary during the electric discharge machining of annular valve seat 12 while the valve body 10 is rotated by spindle 22 and cylindrical surface 40 on outer sleeve 37 is guided by the bore 11. Since conical surface 42 on electrode tip 31 is closely concentric with cylindrical surface 40 which is guided from accurately machined bore 11, the surface of valve seat 12 will be eroded as tip 31 is brought in close proximity thereto to provide a finely finished conical seat which is accurately concentric to bore 11.

While only a single embodiment of the electrode of the invention and a single method of constructing it have been illustrated and described, many modifications and variations thereof will be readily apparent to those skilled in the art, and consequently it is intended in the appended claims to cover all such modifications and variations which are within the true spirit and scope of the invention.

The embodiments of the invention for which an exclusive property or privilege is claimed are defined as follows:

1. An electrode assembly for electric discharge machining a surface in a metallic body having a cylindrical electrode-guiding bore therein comprising an elongated central metallic electrode member, a discharge machining tip at one end of said electrode member having a surface complementary to the desired shape of the surface to be machined on said metallic body, a metallic guide sleeve surrounding a portion of said electrode member intermediate its ends, tubular insulation between said electrode member and said guide sleeve, and an adhesive having high dielectric strength securing said electrode member, said insulation, and said guide sleeve together, said guide sleeve having an accurately machined outer cylindrical surface of a diameter slightly less than said bore and having close concentricity with said surface on said tip.

2. An electrode assembly in accordance with claim 1 wherein said tubular insulation includes narrow strip insulating material helically wound on said electrode member.

3. An electrode assembly in accordance with claim 2 wherein at least a portion of said adhesive is disposed between the helical turns of said insulating strip.

4. An electrode assembly in accordance with claim 2 wherein said electrode member is tubular and has a radially extending aperture therein to allow passage of dielectric cooling liquid through the axial opening in said electrode member.

5. An electrode assembly in accordance with claim 1 wherein said surface on said tip is machined subsequent to said outer cylindrical surface and while said electrode assembly is rotating about the axis of said cylindrical surface.

6. The method of constructing an electrode assembly for electric discharge machining a surface in a metallic body having a cylindrical electrode-guiding bore therein comprising the steps of providing an elongated central metallic electrode member having an electric discharge machining tip at one end thereof, helically winding narrow strip insulating material on said electrode member intermediate its ends, applying adhesive to and between said helical turns of strip material, inserting over said helical turns of strip material and said adhesive a metallic sleeve having an accurately machined cylindrical outer surface of slightly smaller diameter than said bore, allowing said adhesive to set, and subsequently machining a surface on said tip complementary to the desired shape of the surface to be machined on said metallic body while said electrode assembly is rotated about the axis of said cylindrical surface.

No references cited.

RICHARD M. WOOD, *Primary Examiner.*

R. F. STAUBLY, *Assistant Examiner.*